United States Patent
Faoro et al.

(10) Patent No.: US 10,373,417 B1
(45) Date of Patent: Aug. 6, 2019

(54) SYSTEMS, METHODS AND DEVICES FOR DETECTING UNAUTHORIZED DEVICES AT TRANSACTION DEVICES

(71) Applicant: VeriFone, Inc., San Jose, CA (US)

(72) Inventors: Davey Faoro, Newcastle, CA (US); Donald James Jones, Auburn, CA (US)

(73) Assignee: VeriFone, Inc., San Jose, CA (US)

( * ) Notice: Subject to any disclaimer, the term of this patent is extended or adjusted under 35 U.S.C. 154(b) by 0 days.

(21) Appl. No.: 15/909,085

(22) Filed: Mar. 1, 2018

(51) Int. Cl.
*G07F 19/00* (2006.01)
*G07F 7/12* (2006.01)
*G06Q 20/38* (2012.01)
*G07F 7/08* (2006.01)

(52) U.S. Cl.
CPC ............ *G07F 7/12* (2013.01); *G06Q 20/382* (2013.01); *G07F 7/088* (2013.01); *G07F 7/0813* (2013.01); *G07F 19/2055* (2013.01)

(58) Field of Classification Search
CPC ........ G07F 7/12; G07F 19/2055; G07F 7/088; G07F 7/0813; G06Q 20/382
See application file for complete search history.

(56) References Cited

U.S. PATENT DOCUMENTS

| | | | | |
|---|---|---|---|---|
| 5,164,576 A | * | 11/1992 | Anglin | G06K 7/015 235/449 |
| 5,317,137 A | * | 5/1994 | Wilkins | G06K 7/084 235/380 |
| 2009/0204539 A1 | * | 8/2009 | Parker | G06Q 20/105 705/41 |
| 2018/0314862 A1 | * | 11/2018 | Traynor | G06K 7/087 |
| 2018/0336756 A1 | * | 11/2018 | MacKinnon | G06F 21/00 |

OTHER PUBLICATIONS

Nolen Scaife, Christian Peeters, Patrick Traynor, Fear the Reaper: Characterization and Fast Detection of Card Skimmers, Aug. 15, 2018 (Year: 2018).*

* cited by examiner

*Primary Examiner* — Christle I Marshall
(74) *Attorney, Agent, or Firm* — Greenberg Traurig LLP

(57) ABSTRACT

Systems, methods and devices for detecting unauthorized devices at transaction devices are disclosed. A method for detecting an unauthorized device in a card slot of a transaction device may include inserting a card slot insert into a card slot for a transaction device, wherein the card slot insert has a width and thickness based on a manufactured width and thickness of the transaction device, and comprises a first indicator indicating that the card slot is secure and a second indicator indicating that the card slot is not secure. When the card slot insert is inserted to a manufactured depth of the card slot, the first indicator is visible outside the card slot, and the second indicator is not visible outside the card slot. When an object is in the card slot, the first indicator and at least a portion of the second indicator are visible outside the card slot.

20 Claims, 8 Drawing Sheets

SYSTEMS, METHODS AND DEVICES FOR DETECTING UNAUTHORIZED DEVICES AT TRANSACTION DEVICES

BACKGROUND OF THE INVENTION

1. Field of the Invention

The present disclosure relates generally to point of sale devices, and, more particularly to systems, methods and devices for detecting unauthorized devices at transaction devices.

2. Description of the Related Art

Unscrupulous parties often install devices on point of sale devices that capture information from transaction cards (e.g., account information), or from user input (e.g., a personal identification number). These devices (commonly referred to as "skimmers") are often installed on or over a portion of the point of sale device, such as the card slot or keypad, and are designed to look like they are part of the point of sale so they do not raise any suspicions of a customer. These devices, however, include electronics that capture magnetic stripe data, chip data, and/or PIN data without the customer knowing that this is happening.

For example, a skimmer may be installed within the card slot itself. Because card dimensions may vary, card slots on transaction devices must accommodate these differences. As a result, if a user's card is not of the maximum allowable dimensions, then the user may not notice that an unauthorized device has been inserted into the card slot.

SUMMARY OF THE INVENTION

Systems, methods and devices for detecting unauthorized devices are disclosed. In one embodiment, a device for detecting an unauthorized device in a card slot of a transaction device may include a card slot insert having a width and thickness based on a manufactured width and thickness of the transaction device; a first indicator indicating that the card slot is secure; and a second indicator indicating that the card slot is not secure. When the card slot insert is inserted to a manufactured depth of the card slot, the first indicator is visible outside the card slot, and the second indicator is not visible outside the card slot. When an object is in the card slot, the first indicator and at least a portion of the second indicator are visible outside the card slot.

In one embodiment, the first indicator is positioned based on the manufactured depth of the card slot.

According to another embodiment, a method for detecting an unauthorized device in a card slot of a transaction device may include inserting a card slot insert into a card slot for a transaction device, wherein the card slot insert has a width and thickness based on a manufactured width and thickness of the transaction device, and comprises a first indicator indicating that the card slot is secure and a second indicator indicating that the card slot is not secure. When the card slot insert is inserted to a manufactured depth of the card slot, the first indicator is visible outside the card slot, and the second indicator is not visible outside the card slot, and when an object is in the card slot, the first indicator and at least a portion of the second indicator are visible outside the card slot.

In one embodiment, the first indicator and/or the second indicator is positioned based on the manufactured depth of the card slot.

According to another embodiment, a device for detecting an unauthorized device at a transaction device may include a card slot insert having a width and thickness based on a manufactured width and thickness of the transaction device and having a first indicator indicating that the transaction device is secure, and a second indicator indicating that the transaction device is not secure; a device measuring tool configured to interact with a portion of the transaction device, the device measuring tool having a size and shape based on a known dimension of the transaction device, and the card slot insert is configured to receive the device measuring tool. When the card slot insert is inserted into the card slot, the device measuring tool is received by the card slot insert, and the device measuring tool is urged toward the portion of the transaction device, the first indicator is visible when there is no obstruction between the device measuring tool and the transaction device, and when the card slot insert is into the card slot, the device measuring tool is received by the card slot insert, and the device measuring tool is urged toward the portion of the transaction device, the second indicator is visible when there is an obstruction between the device measuring tool and the transaction device.

In one embodiment, the card slot insert may be inserted to a manufactured depth of the card slot.

In one embodiment, the portion of the transaction device may be a keypad, a touchscreen, a magnetic stripe reader, etc.

In one embodiment, the device may further include a plurality of device measuring tools, each device measuring tool having a size and shape based on a known dimension of a different portion of the transaction device.

In one embodiment, the known dimension of the transaction device may be a manufactured dimension of the transaction device.

In one embodiment, the card slot insert may include a third indicator indicating that the card slot is secure and a fourth indicator indicating that the card slot is not secure.

In one embodiment, the device measuring tool may include an opening for viewing the first indicator or the second indicator.

According to another embodiment, a method for detecting an unauthorized device in a card slot of a transaction device may include: (1) inserting a card slot insert into a card slot for a transaction device, wherein the card slot insert has a width and thickness based on a manufactured width and thickness of the transaction device and comprises a first indicator indicating that the transaction device is secure and a second indicator indicating that the transaction device is not secure; (2) interfacing a device measuring tool with the card slot insert, wherein the device measuring tool is configured to interact with a portion of the transaction device and has a size and shape based on a known dimension of the transaction device; and (3) urging the device measuring tool toward the portion of the transaction device. When the first indicator is visible when there is no obstruction between the device measuring tool and the transaction device, and when the second indicator is visible when there is an obstruction between the device measuring tool and the transaction device.

In one embodiment, the card slot insert may be inserted to a manufactured depth of the card slot.

In one embodiment, the portion of the transaction device may be a keypad, a touchscreen, a magnetic stripe reader, etc.

In one embodiment, the device may further include a plurality of device measuring tools, each device measuring tool having a size and shape based on a known dimension of a different portion of the transaction device.

In one embodiment, the known dimension of the transaction device may be a manufactured dimension of the transaction device.

In one embodiment, the device measuring tool may include an opening for viewing the first indicator or the second indicator.

In one embodiment, the card slot insert may include a third indicator indicating that the card slot is secure and a fourth indicator indicating that the card slot is not secure. When the card slot insert is inserted to a manufactured depth of the card slot, the third indicator is visible outside the card slot, and the fourth indicator is not visible outside the card slot, and when an object is in the card slot, the third indicator and at least a portion of the fourth indicator are visible outside the card slot.

In one embodiment, at least one of the third indicator and the fourth indicator is positioned based on the manufactured depth of the card slot.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1A:
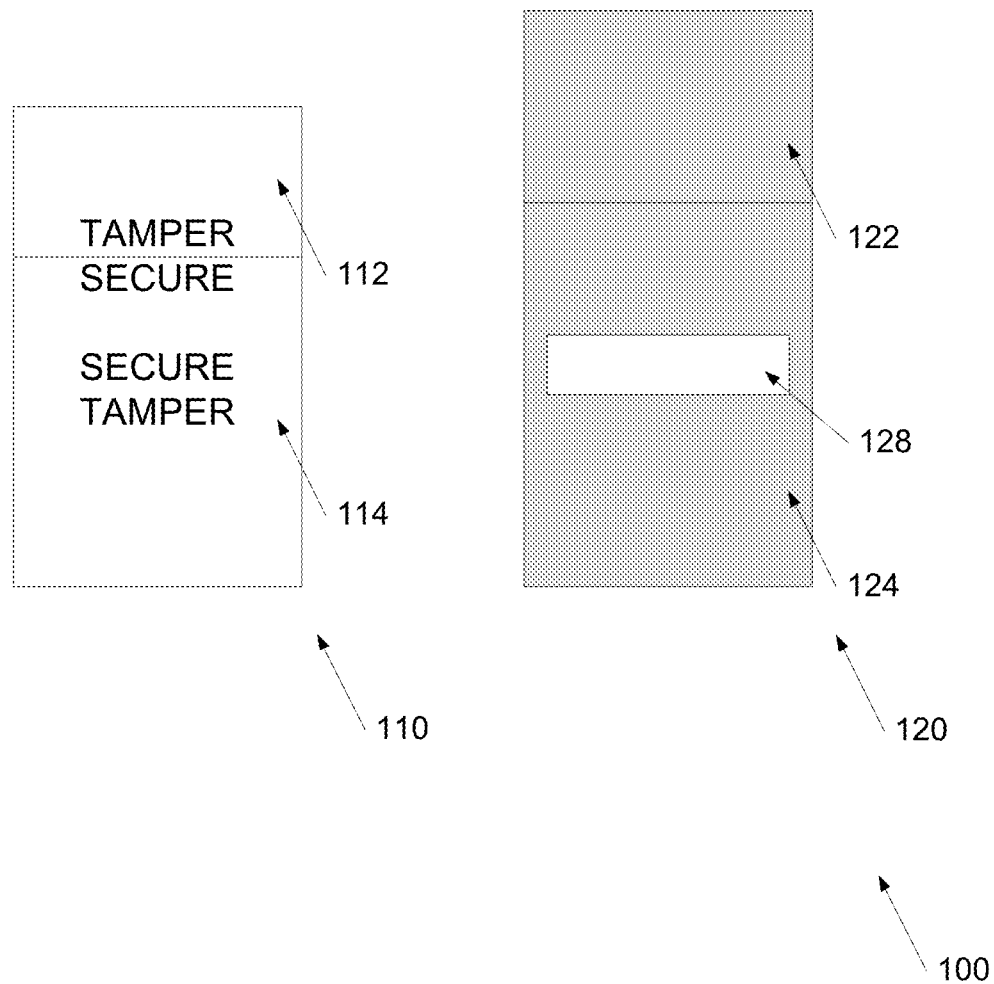
FIGS. 1A and 1B depict an illustrative device for detecting unauthorized devices at according to one embodiment.

Several embodiments of the present invention and their advantages may be understood by referring to FIGS. 1-7.

Embodiments are directed to methods and devices for detecting the presence of unauthorized devices at transaction devices, such as point of sale devices. Although embodiments may be depicted in the context of stand-alone point of sale devices, it should be recognized that embodiments have applicability with any device having known dimensions that may receive information from a card (e.g., a transaction card) or from a user, including, for example, card readers and/or keypads at gas station pump, vending machines, point of sale devices, ATMs, kiosks, locks, etc.

Embodiments disclosed herein may detect the presence of an unauthorized device at a transaction device using at least one known reference point on the transaction device to verify one or more dimension of the transaction device. If a dimension of the transaction device being measured differ from a known dimension of an uncompromised transaction device, an unauthorized device may be present at the transaction device.

In one embodiment, the known reference point may be based on the location of the card slot that receives a card (e.g., credit card, debit card). For example, the card slot may have an industry standard height, width, and depth. Alternatively, the manufactured height, width, and depth of the card slot may be used. Using the card slot as a reference, an actual dimension of the transaction device from the reference point or area (e.g., card slot) may be compared to at least one known dimension for a manufactured (e.g., uncompromised) transaction device to determine whether an unauthorized device is suspected to be present. By using a fixed and repeatable point to attach the tool, such as insertion of a card slot insert and a card slot, the measurement of the at least one known dimension can be repeated with relative confidence that the correct measurement is being made.

In one embodiment, the card slot may be a smart card slot, a dip reader slot, etc.

Dimensions that may be compared and verified may include the dimensions of the card slot (e.g., height, width, and depth), distances from the reference point or area to a second point or area on the transaction device, shapes of the transaction device relative to the reference point or area, etc. Of particular interest are the input devices (e.g., keypads, card readers, etc.) that may be compromised through the use of overlays or other add-on devices that may capture the input data. Such overlays or other add-on devices are generally designed to replicate the appearance of the transaction device on which it is placed, but will alter the dimensions of the transaction device.

Although this disclosure is made in the context of using the card slot as a known reference point or area, it should be understood that other points on the transaction device may be used as reference points or areas as is necessary and/or desired. Similarly, it should be recognized that other devices that interact with a transaction device may be used, such as device that may slide over the transaction device.

Figure 1B:
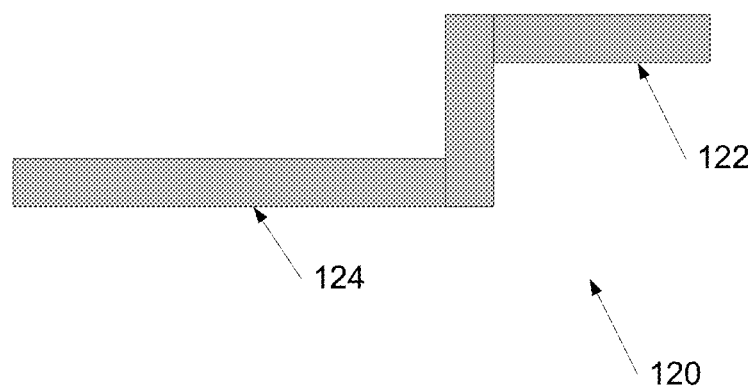

Referring to FIGS. 1A and 1B, an exemplary device for detecting the presence of an unauthorized device at a transaction device is disclosed according to one embodiment. Device 100 may have one or two components. First, card slot insert 110 may be used to detect the presence of unauthorized devices in a card slot of a transaction device. For example, insert portion 112 of card slot insert 110 may be inserted into the card receiving slot, and indicator portion 114 may remain outside the card receiving slot.

In one embodiment, card slot insert 110 may be sized to accommodate the maximum width and maximum thickness of a card specified in the EMV card standard (i.e., 85.6× 53.98×0.76 mm). Alternatively, the manufactured width and thickness of the card slot may be used. In one embodiment, the length of card slot insert 110 may vary as is necessary and/or desired.

Card slot insert 110 may include indicators (e.g., labels, markings, symbols, colors, etc.) to indicate to a user whether suspected unauthorized devices are present in the card slot. For example, card slot insert 110 may include an indicator based on the standard or manufactured depth of the card slot. When card slot insert 110 is fully inserted into the card slot (based on either the standard or the manufactured dimensions), a first indicator, such as "Secure" may be aligned with the outer edge of the card slot. If card slot insert 110 cannot be fully inserted into the card slot, indicating some sort of obstruction in the card slot, a second indicator, such as "Tamper" may be visible outside of the card slot indicating that an unauthorized device may be present, or that someone may have tampered with the transaction device in some manner. If card slot insert 110 cannot be inserted into the card slot at all, that may indicate the presence of an unauthorized device in the card slot, or that someone may have tampered with the transaction device in some manner.

The size, positioning, location, type, etc. of the indicators may vary based on, for example, the model of the device.

It should be recognized that the indicators "Secure" and "Tamper" are exemplary only, and that any indicator that indicates whether the transaction device is secure or tampered with may be used as is necessary and/or desired. For example, colors, symbols, letters, logos, words, markings, raised markings/symbols (e.g., Braille markings, X, etc.), etc. may be used to convey the results of the evaluation.

In one embodiment, only one indicator (e.g., only "Secure" or only "Tamper" may be provided on card slot insert 110.

In another embodiment, device 100 may comprise card slot insert 110 and dimension measurement tool 120. A side view of dimension measuring tool 120 is provided in FIG. 1B. In one embodiment, dimension measuring tool 120 may interact with card slot insert 110 to detect the presence of unauthorized devices outside of the card slot. With card slot insert 110 inserted into the card slot, card slot insert 110 may be used as a known reference for measuring known dimensions of the transaction device. For example, dimension measuring tool 120 may be received by card slot insert 110, such as by sliding end 124 of dimension measuring tool 120 over card slot insert 110. Card slot insert 110 may include indicators (e.g., markings, colors, or any other suitable indicator) based on the interaction of card slot insert 110 and dimension measuring tool 120 that may indicate whether the transaction device is secure or tampered. Dimension measuring tool 120 may include window or opening 128, which may allow the indicator on card slot insert 110 to be seen. Alternatively, dimension measuring tool 120, may be designed to be shorter than the full length of card slot insert 110 such that location of one end of dimension measuring tool 120 may expose an indicator of whether the device may be secure or tampered. Other manners of indicating whether the transaction device is secure may be used as is necessary and/or desired.

In one embodiment, dimension measuring tool 120 may be pivotably and/or slidably connected on card slot insert 110.

Dimension measuring tool 120 may be sized to interact with card slot insert 110 and the device based on dimensions of a manufactured transaction device, or a known, uncompromised transaction device. For example, end 122 of dimension measuring tool 120 may be sized such that when dimension measuring tool 120 interacts with card slot insert 110, and also interacts with the transaction device (e.g., it is pressed toward the device until it cannot go any further), a "secure" indicator may be viewed through window or opening 128. The dimensions of dimension measuring tool 120 may be selected to verify any suitable dimension, such as the height of the keypad, height of the touchscreen, position of a magnetic stripe slot, etc.

In one embodiment, a plurality of dimension measuring tool 120 may be used. Each dimension measuring tool 120 may have a size and/or shape to interact with a different part of the transaction device (e.g., one for the keypad, one for the screen, one for the magnetic stripe reader, etc.).

When dimension measuring tool 120 interacts with card slot insert 110 and is urged toward a transaction device having an unauthorized device positioned thereon, the presence of the unauthorized device may prevent dimension measuring tool 120 from sliding to the same position it would in the known, uncompromised transaction device because of the additional height that the unauthorized device adds to the keypad. Thus, a "Tamper" or similar label may be is visible through window or opening 128, indicating that an unauthorized device, such as a keypad overlay, may be present.

For example, when card slot insert 110 is fully inserted into a card slot of a transaction device, and dimension measuring tool 120 is properly engaged with card slot insert 110, end 122 may be designed so that the bottom surface of end 122 is able to slide over the top of keys of a keypad of the unadulterated transaction device with little to no clearance and without pushing the keys downward. If an overlay has been placed over or on top of the keypad, then end 122 will be unable to slide over the top of the keypad, as the added height of the overlay will prevent end 122 from advancing. Preferably, a window will show a label or other indicator that an unauthorized device may be present.

Device 100, including card slot insert 110 and dimension measuring tool 120, may be passive, and may contain no electronics. In one embodiment, card slot insert 110 and/or dimension measuring tool 120 may be made of plastic to eliminate or reduce the possibility of electrostatic discharge.

Figure 2:
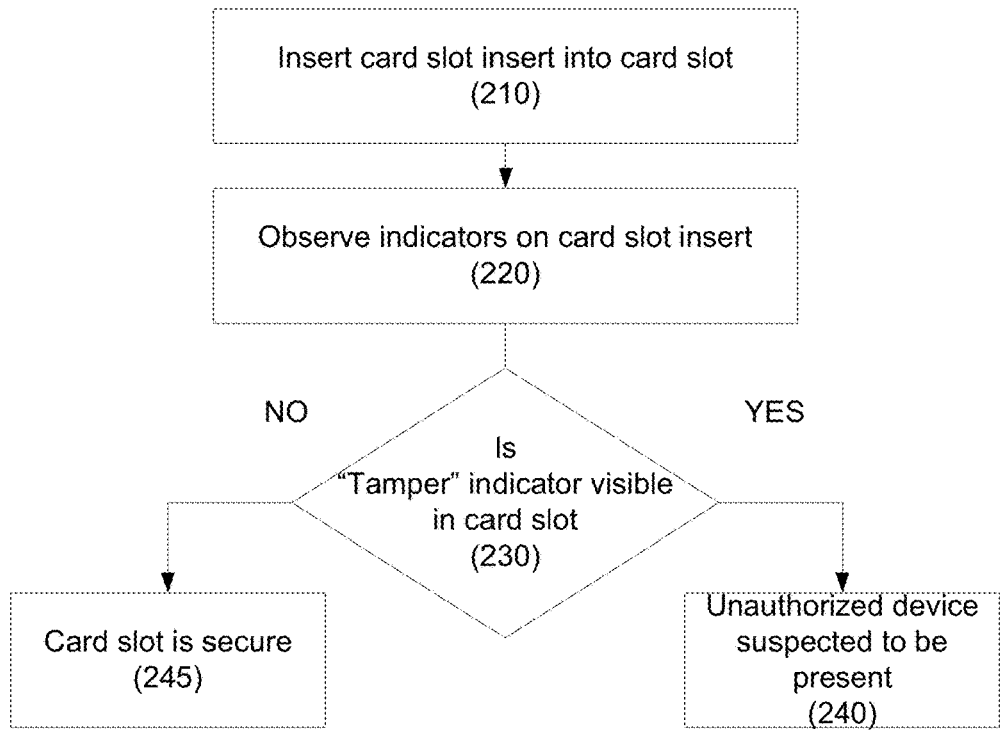
FIG. 2 illustrates a method for detecting unauthorized devices in a card slot of a transaction device according to one embodiment.

Referring to FIG. 2, a method for detecting an unauthorized device in a card slot of a transaction device is provided according to one embodiment. In step 210, a card slot insert may be inserted in to a card slot of a transaction device. The card slot insert may have a height and width based on the manufactured dimensions of the transaction device, an industry standard, etc. In one embodiment, card slot insert may have indicators, such as "secure" and "tamper" positioned thereon based on the depth of the card slot.

In step 220, once the card slot insert is inserted into the card slot, the indicators are observed. If, in step 230, the "tamper" or similar indicator is visible, or the card slot insert cannot be inserted into the card slot, indicating that there is an obstruction in the card slot, in step 240, an unauthorized device may be suspected of being present. If, in step 230, the "tamper" or similar indicator is not visible and/or the "secure" or similar indicator is visible, indicating that the card slot insert can be fully inserted into the card slot with no obstructions, in step 245, it may be determined that the card slot is secure.

Figure 3:
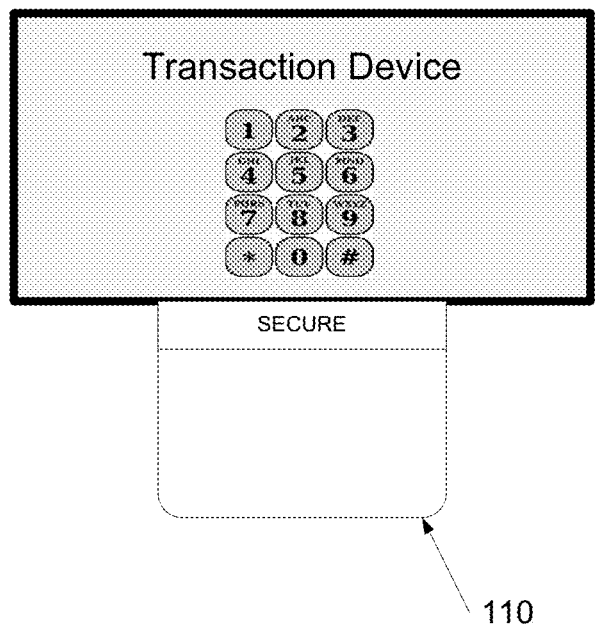
FIG. 3 illustrates a card slot insert inserted into a card slot in an uncompromised transaction device.
Figure 4:
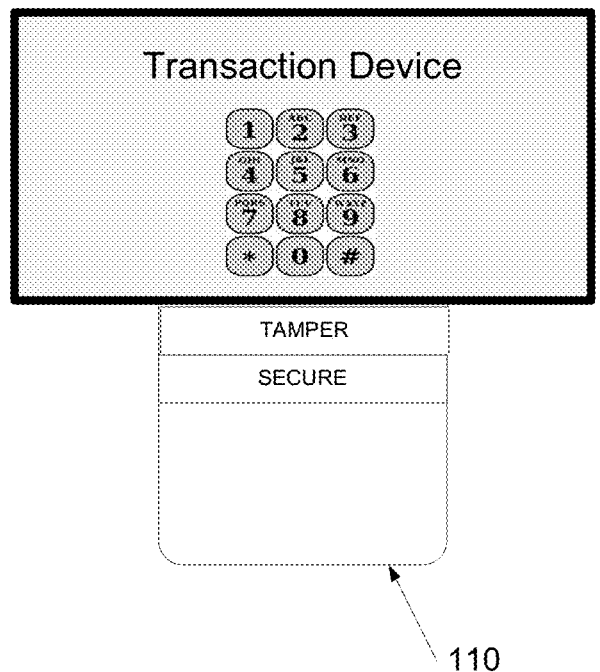
FIG. 4 illustrates a card slot insert inserted into a card slot in a compromised transaction device.

Exemplary illustrations of the card slot insert inserted into a card slot in an uncompromised transaction device, and a card slot insert inserted into a card slot in a compromised transaction device, are provided in FIGS. 3 and 4, respectively.

Figure 5:
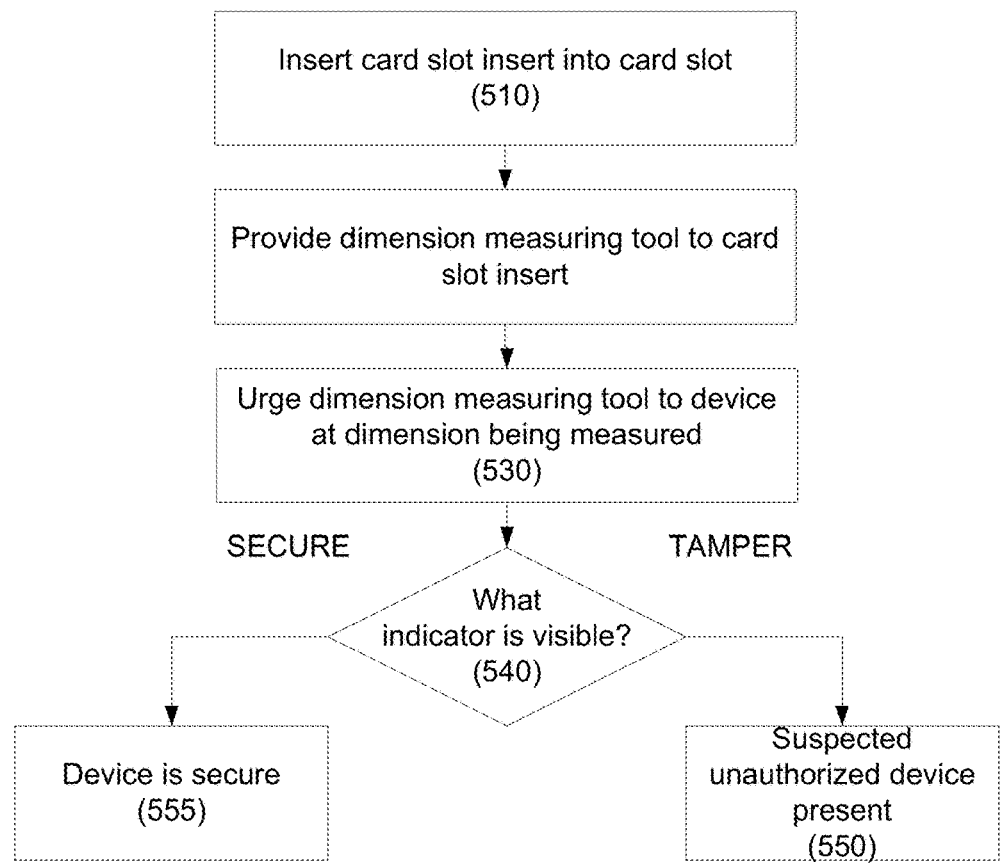
FIG. 5 illustrates a system for detecting unauthorized devices at point of sale devices according to another embodiment.

Referring to FIG. 5, a method for detecting unauthorized devices at point of sale devices is disclosed according to one embodiment. In step 510, a card slot insert may be inserted in to a card slot of a transaction device. The card slot insert may have a height and width based on the manufactured dimensions of the transaction device, an industry standard, etc. In one embodiment, the card slot insert may have indicators, such as "secure" and "tamper," positioned thereon based on the use of a device measuring tool.

In step 520, a device measuring tool may be provided to, or interface with, the card slot insert. In one embodiment, the device measuring tool may interact with the card slot insert by sliding over the end, resting thereon, pivoting thereon, etc. As discussed above, a plurality of device measuring tools may be used, with each device measuring tool sized and/or shaped to interact with a different portion of the transaction device.

In step 530, the device measuring tool may be urged toward the point on the transaction device that is being verified, and the indicators on the device measuring tool may be observed. In one embodiment, the indicators may be visible through a window, cutout, or similar in the device measuring tool.

If, in step 540, the "tamper" or similar indicator is visible, indicating that there is an obstruction in the path of the device measuring tool, in step 550, an unauthorized device may be suspected of being present. If, in step 540, the "secure" or similar indicator is visible, indicating that there is no obstruction, in step 555, it may be determined that the feature associated with the device measuring tool (e.g., the keypad, touchscreen, magnetic stripe reader, etc.) is secure.

Figure 6:
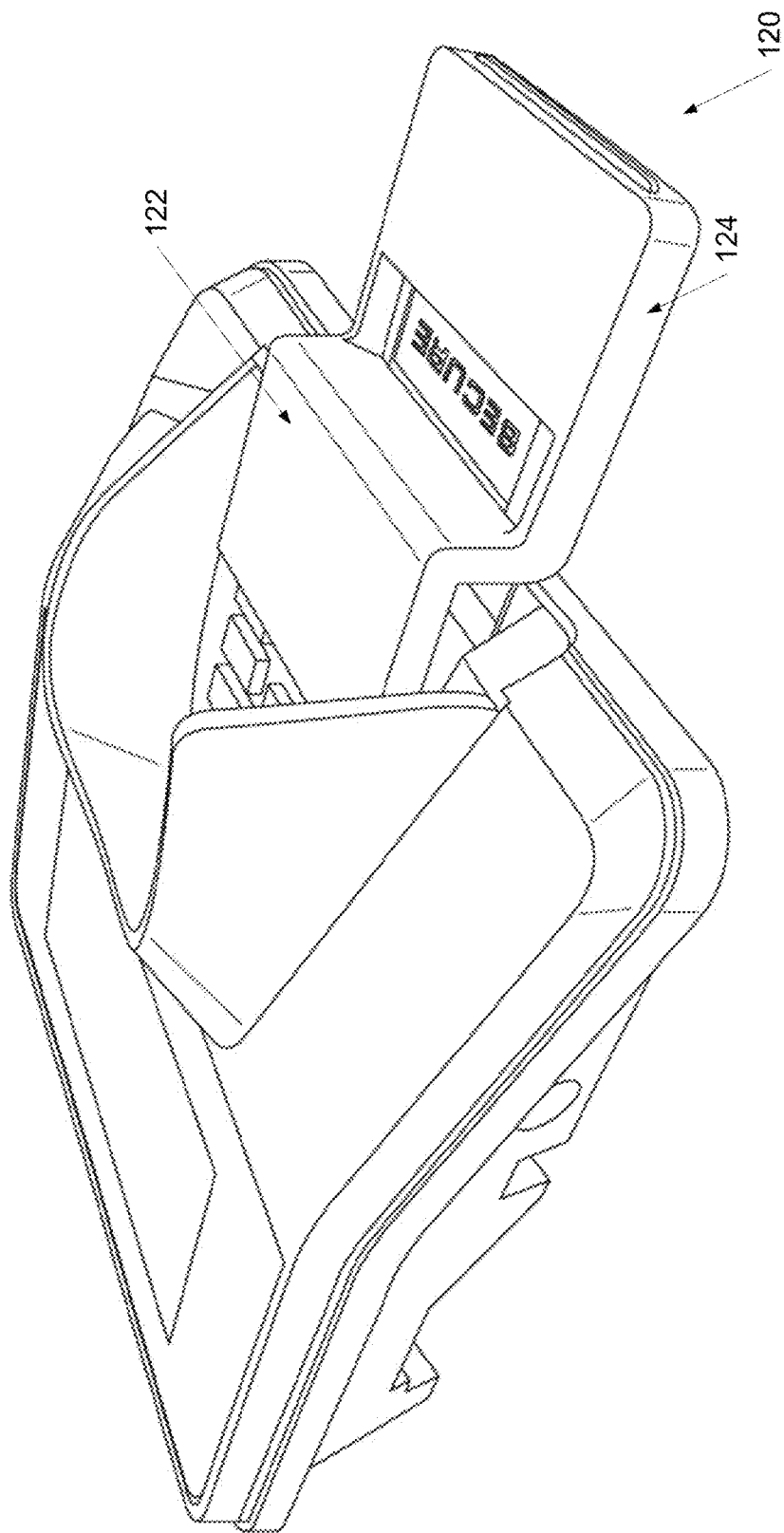
FIG. 6 illustrates a card slot insert and device measuring tool at an uncompromised transaction device.
Figure 7:
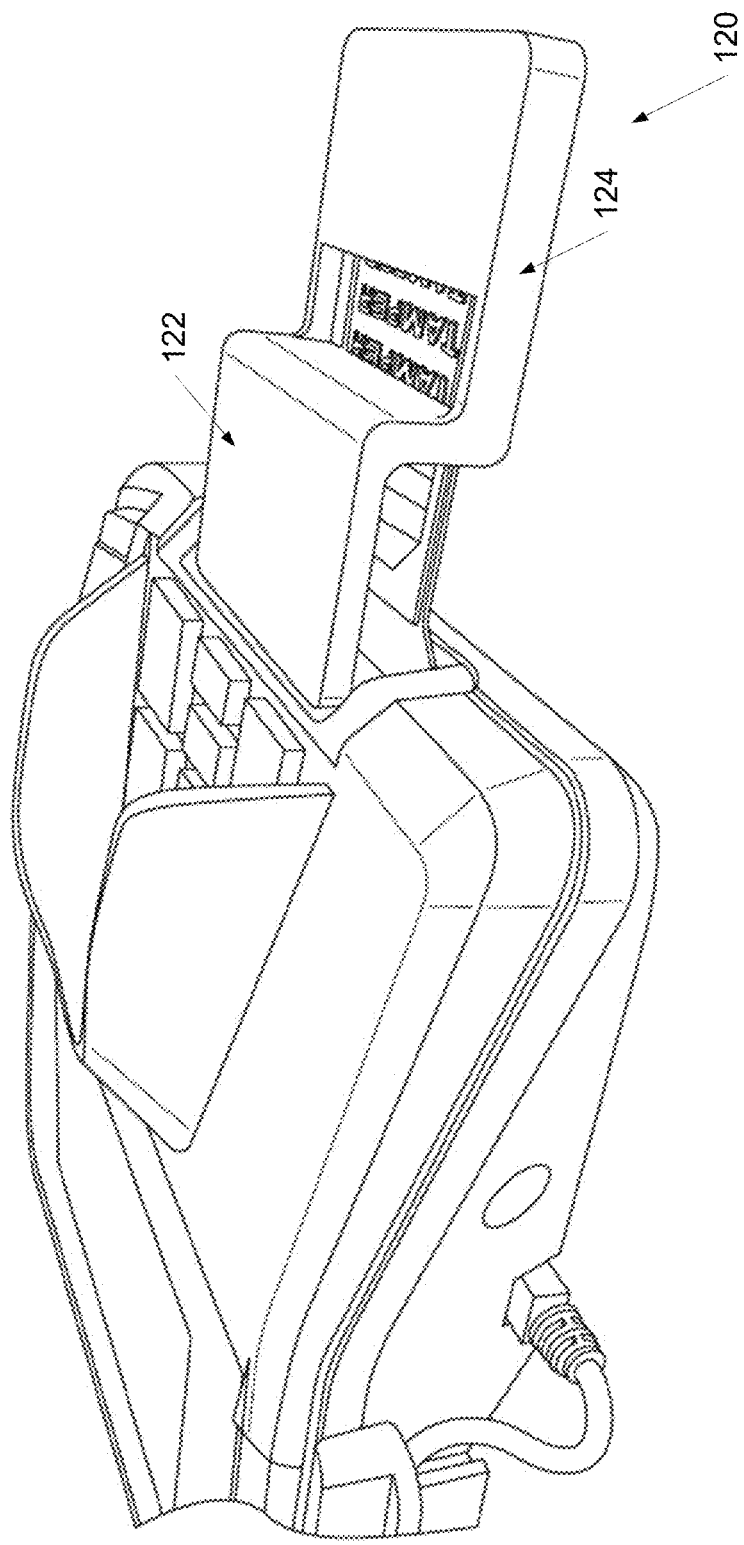
FIG. 7 illustrates a card slot insert and device measuring tool at a compromised transaction device.

Exemplary illustrations of a card slot insert and device measuring tool at an uncompromised transaction device, and a card slot insert and device measuring tool at a compromised transaction device, are provided in FIGS. 6 and 7, respectively.

It will be appreciated by persons skilled in the art that the present invention is not limited by what has been particularly shown and described hereinabove. Rather the scope of the present invention includes both combinations and sub-combinations of features described hereinabove and variations and modifications thereof which are not in the prior art. It should further be recognized that these embodiments are not exclusive to each other.

It will be readily understood by those persons skilled in the art that the embodiments disclosed here are susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A device for detecting an unauthorized device in a card slot of a transaction device, comprising:
    a card slot insert having a width and thickness based on a manufactured width and thickness of the transaction device;
    a first indicator indicating that the card slot is secure; and
    a second indicator indicating that the card slot is not secure;
    wherein:
        when the card slot insert is inserted to a manufactured depth of the card slot, the first indicator is visible outside the card slot, and the second indicator is not visible outside the card slot; and
        when an object is in the card slot, the first indicator and at least a portion of the second indicator are visible outside the card slot.

2. The device of claim 1, wherein at least one of the first indicator and the second indicator is positioned based on the manufactured depth of the card slot.

3. A device for detecting an unauthorized device at a transaction device, comprising:
    a card slot insert having a width and thickness based on a manufactured width and thickness of the transaction device comprising:
        a first indicator indicating that the transaction device is secure; and
        a second indicator indicating that the transaction device is not secure;
    a device measuring tool configured to interact with a portion of the transaction device, the device measuring tool having a size and shape based on a known dimension of the transaction device, and the card slot insert is configured to receive the device measuring tool;
    wherein:
        when the card slot insert is inserted into the card slot, the device measuring tool is received by the card slot insert, and the device measuring tool is urged toward the portion of the transaction device, the first indicator is visible when there is no obstruction between the device measuring tool and the transaction device; and
        when the card slot insert is inserted into the card slot, the device measuring tool is received by the card slot insert, and the device measuring tool is urged toward the portion of the transaction device, the second indicator is visible when there is an obstruction between the device measuring tool and the transaction device.

4. The device of claim 3, wherein the portion of the transaction device is a keypad.

5. The device of claim 3, wherein the portion of the transaction device is a touchscreen.

6. The device of claim 3, wherein the portion of the transaction device is a magnetic stripe reader.

7. The device of claim 3, further comprising a plurality of device measuring tools, each device measuring tool having a size and shape based on a known dimension of a different portion of the transaction device.

8. The device of claim 3, wherein the known dimension of the transaction device comprises a manufactured dimension of the transaction device.

9. The device of claim 3, wherein the device measuring tool comprises an opening for viewing the first indicator or the second indicator.

10. The device of claim 3, wherein the card slot insert comprises a third indicator indicating that the card slot is secure and a fourth indicator indicating that the card slot is not secure;
    wherein:
        when the card slot insert is inserted to a manufactured depth of the card slot, the third indicator is visible outside the card slot, and the fourth indicator is not visible outside the card slot; and
        when an object is in the card slot, the third indicator and at least a portion of the fourth indicator are visible outside the card slot.

11. The device of claim 3, wherein the card slot insert is inserted to a manufactured depth of the card slot.

12. A method for detecting an unauthorized device in a card slot of a transaction device, comprising:
    inserting a card slot insert into a card slot for a transaction device, wherein the card slot insert has a width and thickness based on a manufactured width and thickness of the transaction device and comprises:
        a first indicator indicating that the transaction device is secure; and
        a second indicator indicating that the transaction device is not secure;
    interfacing a device measuring tool with the card slot insert, wherein the device measuring tool is configured to interact with a portion of the transaction device and has a size and shape based on a known dimension of the transaction device; and urging the device measuring tool toward the portion of the transaction device;

wherein:

the first indicator is visible when there is no obstruction between the device measuring tool and the transaction device; and the second indicator is visible when there is an obstruction between the device measuring tool and the transaction device.

13. The method of claim 12, wherein the portion of the transaction device is a keypad.

14. The method of claim 12, wherein the portion of the transaction device is a touchscreen.

15. The method of claim 12, wherein the portion of the transaction device is a magnetic stripe reader.

16. The method of claim 12, wherein the known dimension of the transaction device comprises a manufactured dimension of the transaction device.

17. The method of claim 12, wherein the device measuring tool comprises an opening for viewing the first indicator or the second indicator.

18. The method of claim 12, wherein the card slot insert comprises a third indicator indicating that the card slot is secure and a fourth indicator indicating that the card slot is not secure;

wherein:

when the card slot insert is inserted to a manufactured depth of the card slot, the third indicator is visible outside the card slot, and the fourth indicator is not visible outside the card slot; and when an object is in the card slot, the third indicator and at least a portion of the fourth indicator are visible outside the card slot.

19. The method of claim 18, wherein at least one of the third indicator and the fourth indicator is positioned based on the manufactured depth of the card slot.

20. The method of claim 12, wherein the card slot insert is inserted to a manufactured depth of the card slot.

\* \* \* \* \*